United States Patent
Chang

(10) Patent No.: US 7,900,753 B2
(45) Date of Patent: Mar. 8, 2011

(54) BRAKING RATIO DEVICE FOR A REMOTE CONTROL MODEL CAR

(75) Inventor: Lien Sheng Chang, Taichung Shien (TW)

(73) Assignee: Golden Lion Enterprise Co., Ltd., Taichung Shien (TW)

( * ) Notice: Subject to any disclaimer, the term of this patent is extended or adjusted under 35 U.S.C. 154(b) by 887 days.

(21) Appl. No.: 11/832,793

(22) Filed: Aug. 2, 2007

(65) Prior Publication Data
US 2009/0033143 A1 Feb. 5, 2009

(51) Int. Cl.
*F16D 65/14* (2006.01)

(52) U.S. Cl. ............ 188/204 R; 188/106 P; 188/9

(58) Field of Classification Search .......... 188/24.16, 188/72.7, 72.9, 204 R, 106 R, 9; 446/454, 446/456
See application file for complete search history.

(56) References Cited

U.S. PATENT DOCUMENTS

| | | | | |
|---|---|---|---|---|
| 5,762,532 | A * | 6/1998 | Ishizuka et al. | 446/457 |
| 6,694,837 | B2 * | 2/2004 | Yeh | 74/377 |
| 7,284,457 | B2 * | 10/2007 | Jinno et al. | 74/1 R |
| 7,484,432 | B2 * | 2/2009 | Yamanaka | 74/502.6 |
| 2007/0000739 | A1 * | 1/2007 | Lamarr | 188/72.9 |
| 2007/0012527 | A1 * | 1/2007 | Wu | 188/71.5 |
| 2009/0247045 | A1 * | 10/2009 | Pettey | 446/484 |

* cited by examiner

*Primary Examiner* — Bradley T King
(74) *Attorney, Agent, or Firm* — Ming Chow; Sinorica, LLC

(57) ABSTRACT

A braking ratio device for a remote control model is composed of a suspending arm and a ratio device. The suspending arm is fixed with a shaft of a servo motor, having a controlled member formed at its one side and a driving member extended out from one end of the controlled member. The ratio device is provided with a pivotal base pivotally mounted on the controlled member, and a ratio base connected with the pivotal base to be able to move axially. A front brake connecting rod and a rear brake connecting rod are respectively inserted through two sides of the ratio base, to alter the distance between the front brake connecting rod and a front braking set, and also the distance between the rear brake connecting rod and a rear braking set, for creating a time difference of braking for the front and the rear braking sets.

4 Claims, 7 Drawing Sheets

BRAKING RATIO DEVICE FOR A REMOTE CONTROL MODEL CAR

BACKGROUND OF THE INVENTION

1. Field of the invention

This invention relates to a remote control model car, particularly to one installed with a braking ratio device able to automatically adjust a braking ratio between a front braking set and a rear braking set, for creating a time difference of braking.

2. Description of the Prior Art

As shown in FIG. 1, a conventional braking ratio device installed in the center of a remote control model car is provided with a fixing base 11, a braking disc 12 and a clamping member 13 installed at its two sides respectively. Each of the fixing bases 11 is provided with a shaft 111 installed at its front side. The braking disc 12 is set in the intermediate portion of the clamping member 13 and connected with each other, so that the braking disc 12 can be clamped by the clamping member 13 to stop whirling owing to an abrasion created between the braking disc and the clamping member 13, and the shaft 111 is simultaneously stopped rotating, achieving a braking purpose. Each of the fixing bases 11 is also provided with a brake connecting rod 112 that can be adjusted via two correspondingly installed adjusting bars 113 to relatively control a braking ratio for the front and the rear brake, so as to keep the remote control model car 10 able to smoothly control brakes while running on a bumpy road or a road in bad condition. In using, a user has to operate the adjusting bars 113 respectively to try to obtain a proper braking ratio for the front and the rear brake because the adjusting bars 113 are not connected with each other. However, as the user can merely carry out the operation by a hand's feeling, it is actually not easy to gain a congruous magnitude of adjustment for the brake connecting rods 112 respectively. As a result, the braking ratio is not adjusted so precisely that the remote control model car 10 can not obtain an excellent braking system to adapt to road condition. It is indeed bothering a user.

SUMMARY OF THE INVENTION

The objective of this invention is to offer a braking ratio device for a remote control model.

The main characteristics of the invention are a suspending arm and a ratio device. The suspending arm is fixed with a shaft of a servo motor, provided with a controlled member formed at its one side, and a driving member extended out from one end of the controlled member. The ratio device is provided with a pivotal base pivotally mounted on the controlled member, and a ratio base connected with the pivotal base to be able to move axially. A front brake connecting rod and a rear brake connecting rod are respectively inserted through two sides of the ratio base, so that the distance between the front brake connecting rod and a front braking set and also between the rear brake connecting rod and a rear braking set can be precisely altered by merely adjusting an axial displacement of the ratio base, for automatically creating a time difference of braking for the front braking set and the rear braking set.

BRIEF DESCRIPTION OF DRAWINGS

This invention is better understood by referring to the accompanying drawings, wherein.

DETAILED DESCRIPTION OF THE PREFERRED EMBODIMENT

Figure 1:
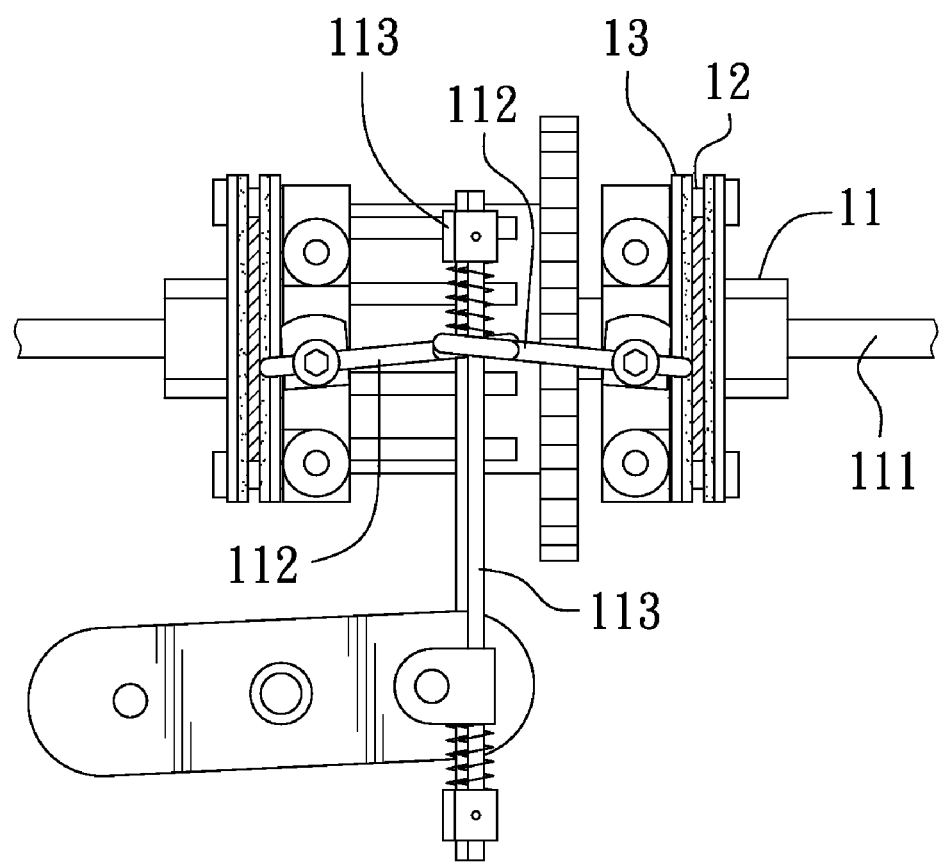
FIG. 1 is a top view of a conventional braking ratio device for a remote control model car.
Figure 2:
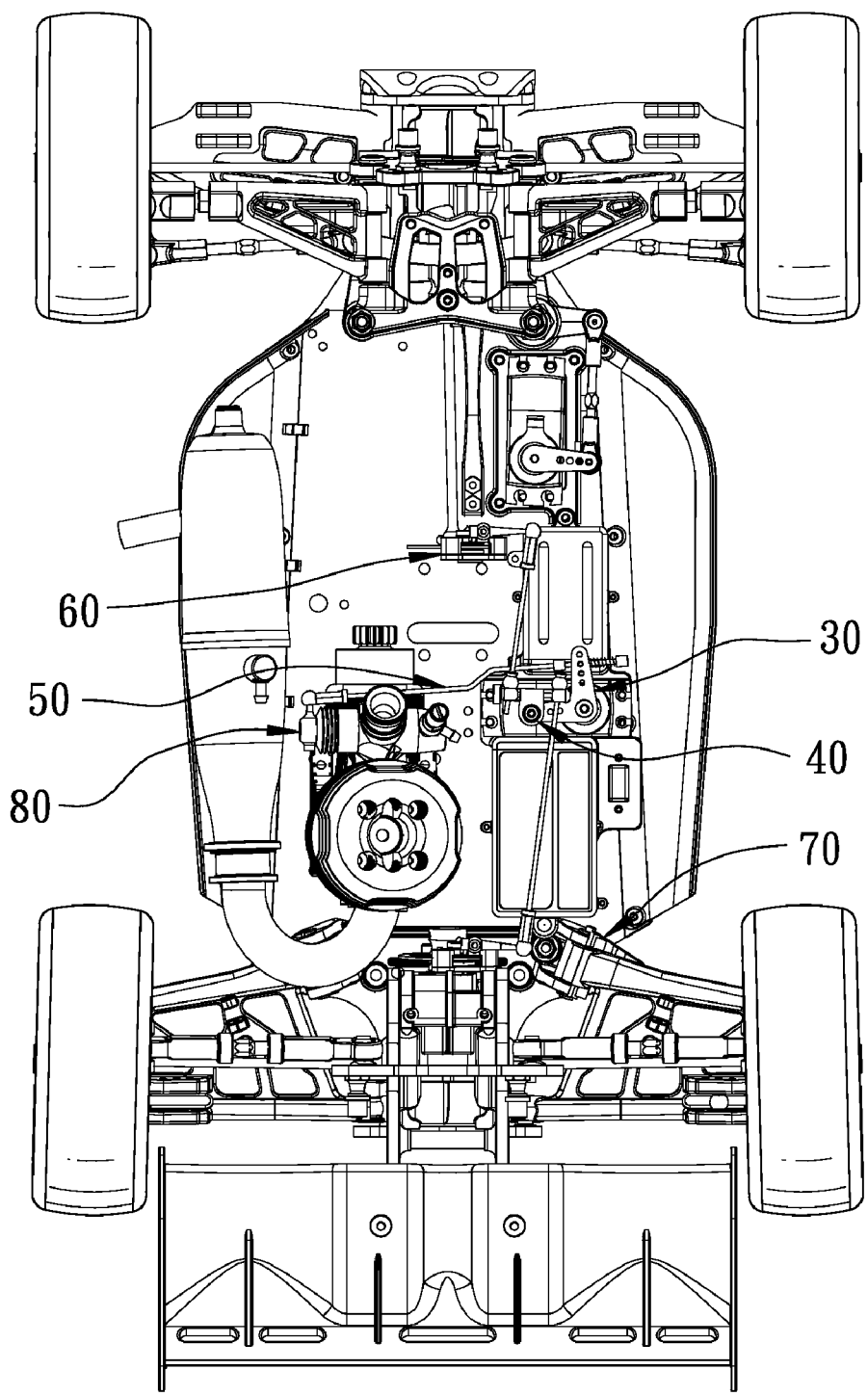
FIG. 2 is a top view of a preferred embodiment of a braking ratio device for a remote control model car in the present invention.
Figure 3:
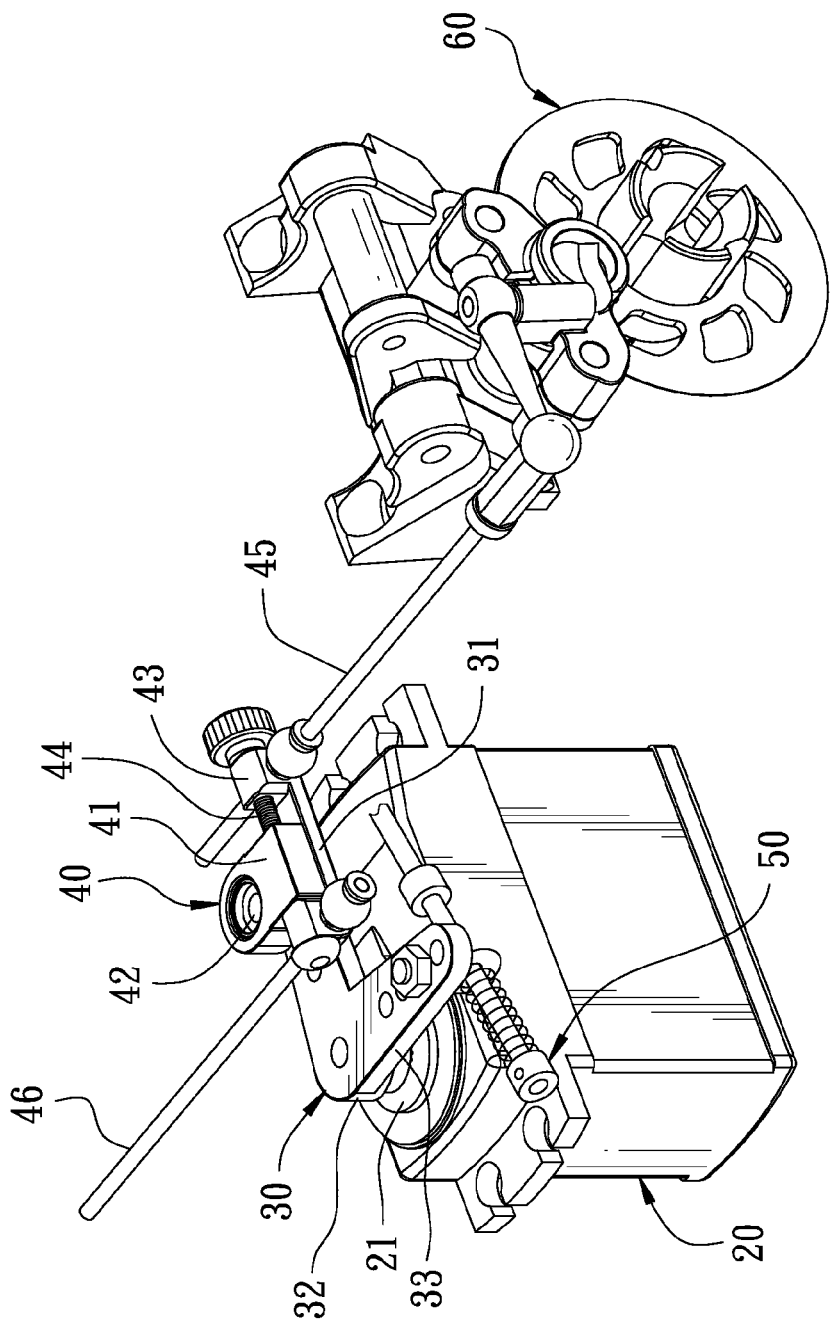
FIG. 3 is a partial perspective view of the preferred embodiment of a braking ratio device for a remote control model car in the present invention.
Figure 4:
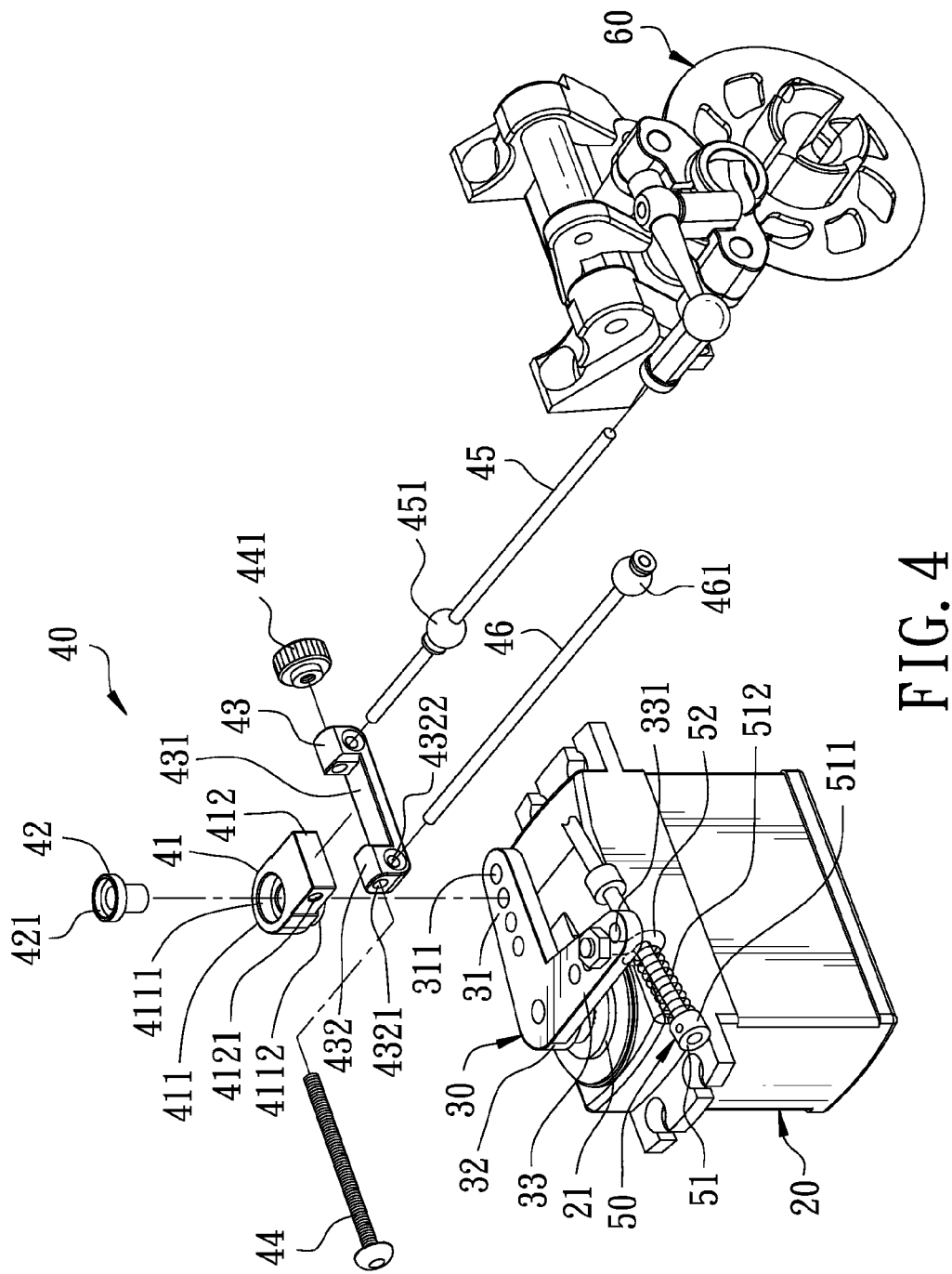
FIG. 4 is an exploded perspective view of the preferred embodiment of a braking ratio device for a remote control model car in the present invention.
Figure 5:
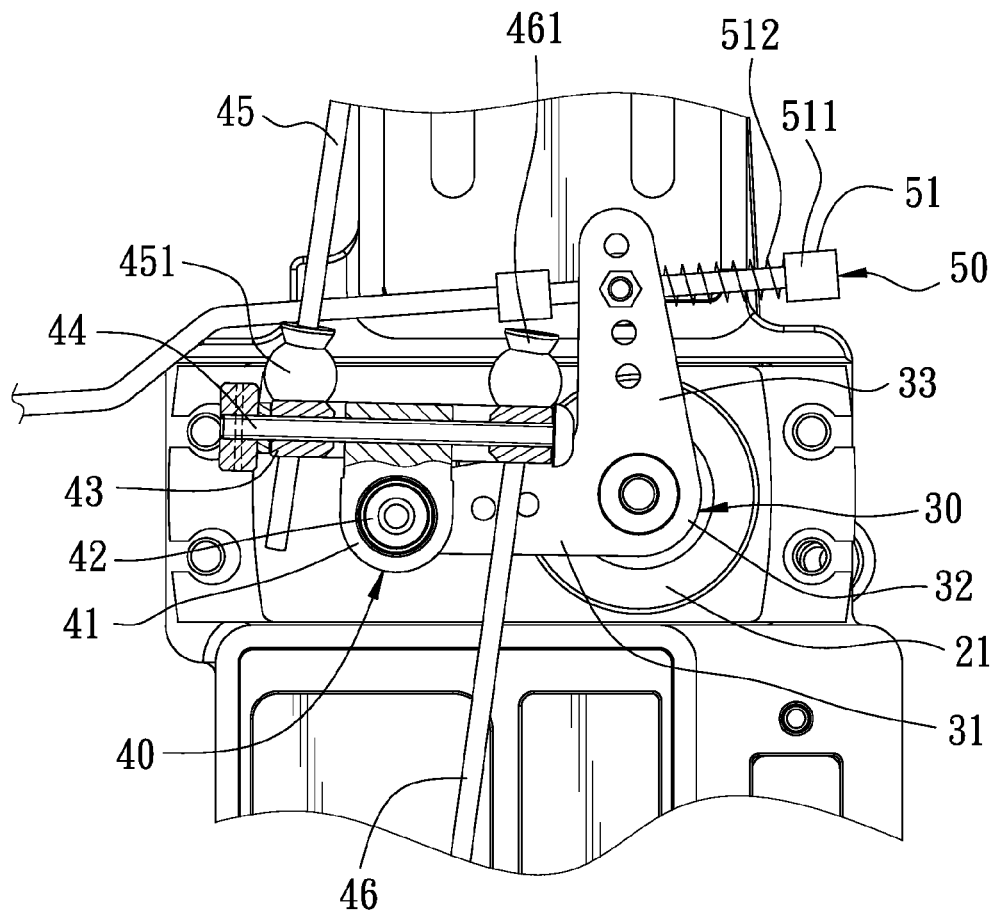
FIG. 5 is a top view of the preferred embodiment of a braking ratio device for a remote control model car in the present invention, showing it being working in a first condition.
Figure 6:
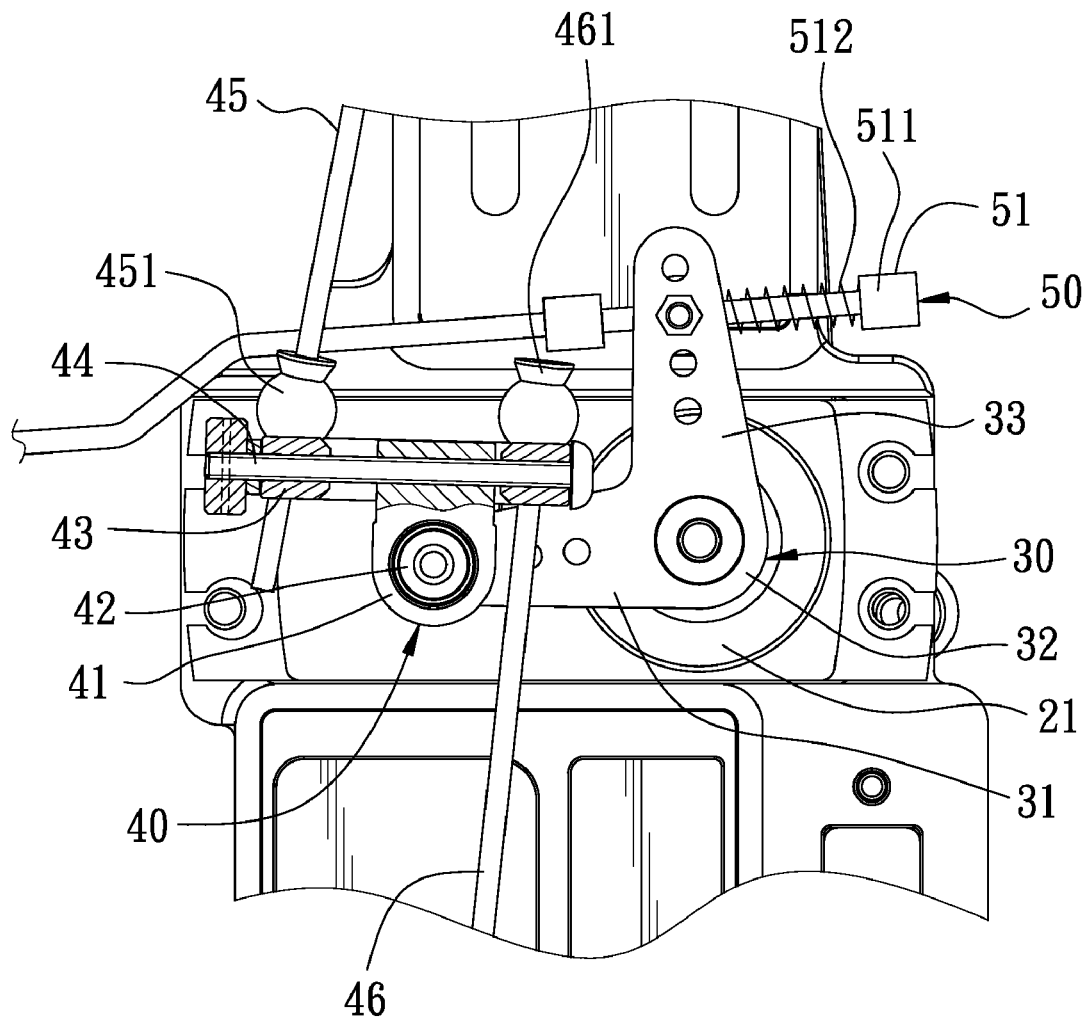
FIG. 6 is a top view of the preferred embodiment of a braking ratio device for a remote control model car in the present invention, showing it being working in a second condition.
Figure 7:
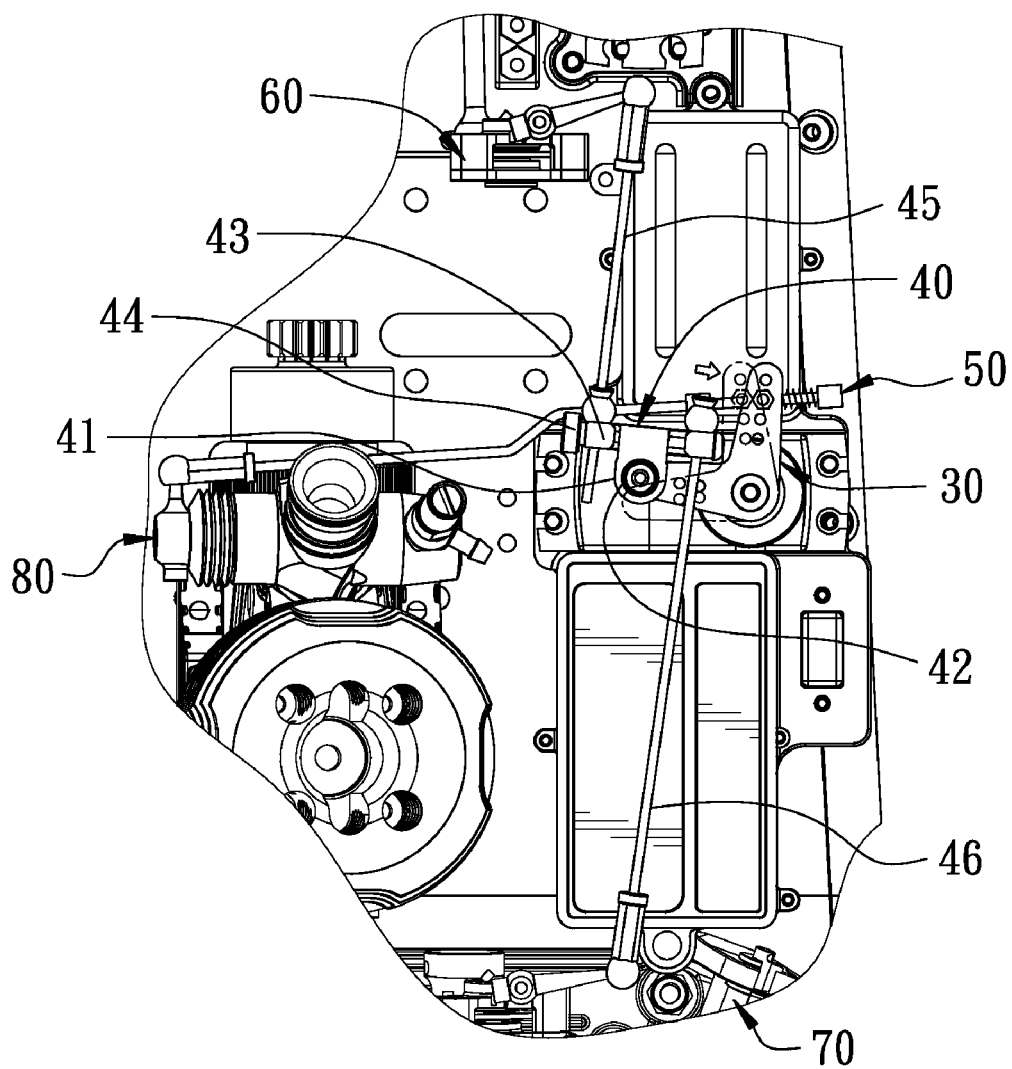
FIG. 7 is a top view of the preferred embodiment of a braking ratio device for a remote control model car in the present invention, showing it being adjusted.

As shown in FIGS. 2~4, a preferred embodiment of a braking ratio device for a remote control model car in the present invention is composed of a servo motor 20, a suspending arm 30, a ratio device 40, a carburetor connecting rod 50, a front brake set 60, a rear brake set 70 and a carburetor 80 as main components.

The servo motor 20 is provided with a shaft 21 extended upwards from its top.

The suspending arm 30 is provided with a controlled member 31 formed at its rear portion, a connecting member 32 formed at one end of the controlled member 31 for being fixed with the shaft 21 of the servo motor 20 to be able to rotate with a preset angle, and a driving portion 33 extended out from the connecting member 32 to form a preset angle with the controlled member 31. And, the controlled portion 31 is bored with four operating hole 311 and the driving portion 33 is also bored with four through holes 331.

The ratio device 40 is composed of a pivotal base 41, a positioning pin 42, a ratio base 43, a threaded bar 44, a front brake connecting rod 45 and a rear brake connecting rod 46.

The pivotal base 41 is provided with a positioning member 411 formed at its front end, and an acting 412 formed at its rear end. The positioning member 411 is provided with an opening 4111 bored for corresponding to the operating holes 311, and an annular projection 4112 that is extended downwards from the bottom of the opening 4111, with a diameter slightly smaller than that of the opening 4111. And, the acting 412 is bored axially with a through hole 4121.

The positioning pin 42 is formed as exactly the same shape of the opening 4111 and the annular projection 4112, provided with a head 421 formed at its top. The positioning pin 42 is to be inserted through the opening 4111, the annular projection 4112 and one of the operating holes 311 orderly, so as to keep the pivotal base 41 positioned on the operating hole 311 of the suspending arm 30, with the head 421 just engaged with the opening 4111.

The ratio base 43 is provided with a positioning recess 431 cut on the upper intermediate portion for supporting the pivotal base 41, and a connecting portion 432 formed at two sides of the positioning recess 431 respectively. Each of the connecting portions 432 is provided with a through hole 4321 bored axially to correspond to the through hole 4121 of the pivotal base 41, and a connecting hole 4322 bored below and perpendicular to the through hole 4321.

The threaded bar 44 is to be inserted through the through holes 4321 and 4121, provided with a nut 441 for engaging with the end to keep the ratio base 43 positioned under the pivotal base 41.

The front brake connecting rod 45 and the rear brake connecting rod 46 are respectively provided with a head 451 and 461 formed at one end, for being positioned at one side of the connecting portions 432 after having the connecting rods 45 and 46 being inserted through the connecting hole 4322 of the ratio base 43. The other end of each connecting rod 45 and 46 opposite to the head 451 and 461 is connected with a front braking set 60 and a rear braking set 70 respectively.

The carburetor connecting rod 50 is fixed under the through hole 331 of the suspending arm 30, provided with a blocking 51 formed at its one end portion beside the suspending arm 30. The blocking 51 is provided with two blocks 511 and a compression spring 512 installed between the two blocks 511. The carburetor connecting rod 50 is in addition provided with an annular hook 52 positioned under the through hole 331, and connected with a carburetor 80 by the other end opposite to the blocking member 51.

In using, as shown in FIGS. 4~7, the ratio device 40 is first fixed on one of the operating holes 311 by means of the pivotal base 41. The ratio base 43 can be adjusted to move axially to keep the front brake connecting rod 45 and the rear brake connecting rod 46 moved synchronously, enabling the distance between the front brake connecting rod 45 and the front braking set 60 shortened and that between the rear brake connecting rod 46 and the rear braking set 70 lengthened. Thus, the front braking set 60 is to be braked earlier than the rear braking set 70 is, creating a time difference of braking. That is, as the suspending arm 30 is moved clockwise, the controlled portion 31 is to drive the ratio device 40 to rotate, enabling the front brake connecting rod 45 and the rear brake connecting rod 46 located at two sides of the ratio base 43 to respectively push forward the front braking set 60 and the rear braking set 70 to carry out braking. By the time, the carburetor connecting rod 50 is activated to move rightwards by the driving member 33 of the suspending arm 30, enabling the other end of the carburetor connecting rod 50 to block and reduce oil supply to the carburetor 80, helpful to slow down the model car. On the contrary, if the suspending arm 30 is moved counterclockwise, the front brake connecting rod 45 and the rear brake connecting rod 46 are moved backward to keep the front braking set 60 and the rear braking set 70 freed from braking. And, the carburetor connecting rod 50 is moved leftwards to enable the carburetor 80 to continue supplying oil.

The advantages of the invention are described below as can be seen from the foresaid description.

A user needs only to adjust an axial displacement of the ratio base 43 to keep the distance between the front brake connecting rod 45 and the front braking set 60 shorter than that between the rear brake connecting rod 46 and the rear braking set 70, so that a time difference of braking is existent between the front and the rear braking sets 60 and 70. So, the braking ratio for the front and the rear braking sets 60 and 70 can be easily and precisely adjusted by a user.

While the preferred embodiment of the invention has been described above, it will be recognized and understood that various modifications may be made therein and the appended claims are intended to cover all such modifications that may fall within the spirit and scope of the invention.

What is claimed is:

1. A braking ratio device for a remote control model car, said braking ratio device comprising:
    a servo motor provided with a shaft extended upwards from top of the servo motor;
    a suspending arm provided with a controlled member formed at one end portion;
    a connecting member formed at one end of said controlled member for being fixed with said shaft of said servo motor;
    a driving member extended out from said connecting member to form a preset angle with said controlled member;
    said controlled member fixed with said shaft of said servo motor to enable said suspending arm to be whirled with a preset angle by said shaft;
    a ratio device provided with a pivotal base pivotally fixed on said controlled member of said suspending arm;
    a ratio base connected with said pivotal base to move axially;
    a front brake connecting rod and a rear brake connecting rod having one end respectively connected pivotally with two sides of said ratio base;
    a front braking set and a rear braking set respectively connected with another end of said front brake connecting rod and said rear brake connecting rod respectively;
    said ratio base being moved axially to alter a distance between said front brake connecting rod and said front braking set, and a distance between said rear brake connecting rod and said rear braking set also altered to create a time difference of braking between said front braking set and said rear braking set; and
    a carburetor connecting rod fixed under and activated by said driving member of said suspending arm.

2. The braking ratio device for a remote control model car as claimed in claim 1, wherein said controlled member of said suspending arm is bored with four operating holes, said ratio device comprising:
    said pivotal base provided with a positioning member formed at front end of the pivotal base and an acting member formed at rear end of the pivotal base;
    said positioning member provided with an opening bored for corresponding to said operating holes of said controlled member;
    said acting member bored axially with a through hole;
    a positioning pin formed as exactly the same shape of said opening for being inserted through said opening and one of said operating holes to keep said pivotal base positioned on said controlled portion of said suspending arm;
    said ratio base provided with a positioning recess cut on upper intermediate portion of the ratio base for supporting said pivotal base and a connecting member formed at two sides of said positioning recess respectively;
    each of said connecting members formed at two sides of said positioning recess provided with a through hole bored axially to correspond to said through hole of said pivotal base and a connecting hole bored below and perpendicular to said through hole;
    a threaded bar inserted through said through holes of said ratio base and said through hole of said pivotal base and provided with a nut for engaging with an end of the threaded bar to keep said ratio base positioned under said pivotal base; and
    said front brake connecting rod and said rear brake connecting rod respectively provided with a head formed at one end of the front brake connecting rod and said rear brake connecting rod for being positioned at one side of said connecting members of said ratio base after having being inserted through said connecting hole of the ratio base.

3. The braking ratio device for a remote control model car as claimed in claim 1, wherein said driving member of said suspending arm is bored with plural through holes and said carburetor connecting rod is provided with a blocking member located beside said suspending arm;

said blocking member composed of two blocks and a compression spring sandwiched by said blocks;

said carburetor connecting rod having another end opposite to said blocking portion connected with a carburetor of said remote control model car;

said carburetor connecting rod correspondingly alter a position of said carburetor to brake while axially moving said ratio base of said ratio device.

4. The braking ratio device for a remote control model car as claimed in claim 2, wherein said pivotal base is provided with an annular projection extended downwards from a bottom of said opening with a diameter smaller than that of said opening; and said positioning pin is provided with a head formed at top of the positioning pin to be engaged with said opening while inserting said positioning pin into said opening and said annular projection of said pivotal base.

* * * * *